G. H. DAY.
EYE TESTING INSTRUMENT.
APPLICATION FILED DEC. 26, 1917.
1,348,092.
Patented July 27, 1920.
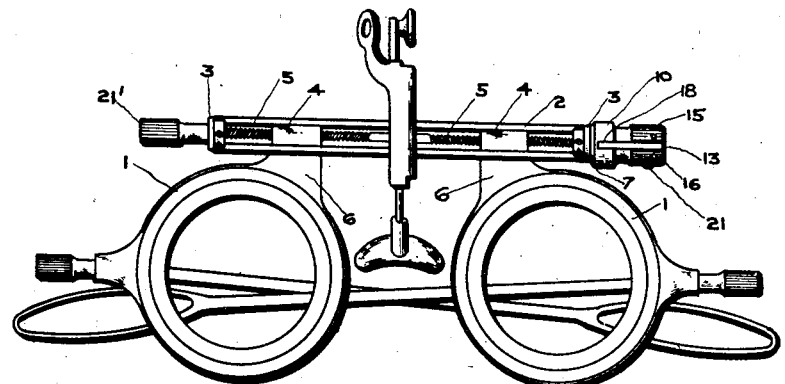
FIG. I
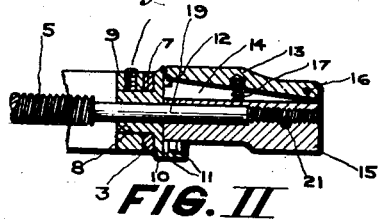
FIG. II
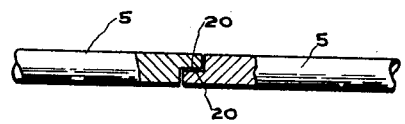
FIG. III
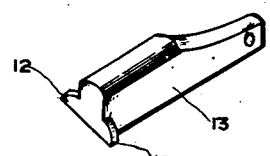
FIG. IV
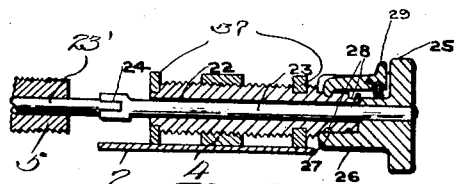
FIG. V
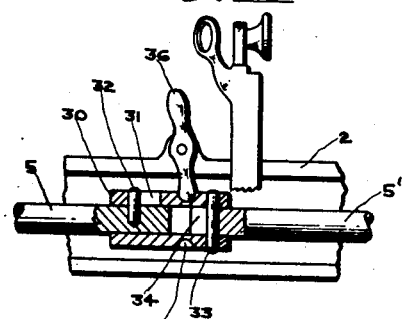
FIG. VI
INVENTOR
GEORGE H. DAY
BY
H. H. Styll, H. K. Parsons
ATTORNEYS

UNITED STATES PATENT OFFICE.

GEORGE H. DAY, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

EYE-TESTING INSTRUMENT.

1,348,092.          Specification of Letters Patent.     Patented July 27, 1920.

Application filed December 26, 1917. Serial No. 208,938.

*To all whom it may concern:*

Be it known that I, GEORGE H. DAY, a citizen of the United States, residing at Southbridge, in the county of Worcester and State of Massachusetts, have invented certain new and useful Improvements in Eye-Testing Instruments, of which the following is a specification.

This invention relates to new and useful improvements in eye testing instruments and relates more particularly to trial frames used for supporting lenses before the eye when testing the vision of a patient and the leading object of the invention is the provision of means for adjusting the lens holding frame separately or simultaneously.

Another object of the invention is the provision of a trial frame whereby the lens frames can be adjusted so that the correct vision of the eyes of a patient is readily obtained through separate or simultaneous adjustment of said frames.

A further object of the present invention is the provision of a trial frame provided with means whereby the lens frames can be quickly and readily adjusted separately or simultaneously and securely held in place after being adjusted to their desired positions.

With the above and other objects in view the invention consists in the novel features of construction and the combination and arrangement of parts hereinafter more fully set forth and pointed out in the accompanying drawings, in which—

Figure I is a front elevation of a trial frame constructed in accordance with my invention.

Fig. II is a longitudinal sectional view through the adjusting means.

Fig. III is a detail section of the clutch members.

Fig. IV is a detail plan view of the spring catch member which holds the movable members in their adjusted positions.

Fig. V is a longitudinal sectional view illustrating a modified form of the invention.

Fig. VI is a similar view illustrating still another form of the invention showing the clutch at the inner ends of the rods.

Referring now more particularly to the drawings it will be noted that I have illustrated my invention as applied to a trial frame which includes in its construction a pair of lens frames 1 supported beneath a longitudinal bar 2 which carries a plurality of bearings 3 and 4, supporting for rotation therein screw threaded rods 5 adapted for longitudinal adjustment. It will be noted that the bearings 3 at the ends of these rods are smooth, while the central bearings 4 are internally threaded for adjustment and are formed on the upper ends of the arms 6 which support the lens frames 1.

The bearing at one end of the bar 2 is provided with an enlarged opening 7 adapted to receive and support a sleeve 8, and mounted upon this sleeve is a collar 9 secured thereto by means of the set screw 9'. Formed on the outer end of the sleeve 8 is a collar 10 provided upon the interior with the circumferential grooves 11 adapted to receive the oppositely projecting fingers 12 formed upon the outer end of the pivoted arm 13 and extending from opposite sides thereof. This arm 13 is movably disposed within a channel 14 formed within the elongated cap member 15 and is pivoted at its outer end between the walls of this channel by means of the pin 16, said arm being normally held in a raised position by means of a coil spring 17 which is disposed between the arm and the bottom of the channel. When the collar 10 and cap 15 are arranged in their relative positions the arm 13 is disposed within an elongated aperture 18 formed in the collar so that the fingers 12 may be disposed in the grooves 11 at either end of the collar.

It will be noted from a view of the accompanying drawings that the cap 15 is threaded upon the outer end of the rod so that upon turning movement of the cap the rod is also turned, but as the collar 10 is mounted upon the smooth portion 19 of the rod and held against sliding movement by having the collar 9 secured upon the sleeve 8, the rod can be moved through the sleeve 8 whereby the finger 12 on the arm 13 can be disposed in either of the grooves 11 and held in place through the tension of the spring 17.

The inner ends of the rods 5 are formed with apposed clutch faces 20 so that when these faces are engaged the rods will be rotated together and are easily disengaged by actuating the arm 13 to release the fingers 12 from the grooves 11 to permit of a sliding movement of the rod 5. The cap 15 is securely held from unscrewing off the rod 5 by means of a set screw 21 which extends through the wall of the cap and engages at its inner end with the threaded portion of the rod thus retaining the rod against turning movement.

From the above description taken in connection with the accompanying drawings it will be readily apparent that by adjustment of one of the rods 5 to bring the inner ends thereof into contact with each other both frames may be moved simultaneously, and when the ends are disengaged the frames may be adjusted separately by turning the caps 15 and 21' to rotate either one of the rods, it being understood that the cap 21' is secured to one of the rods 5 at the opposite end of the frame from the cap 15. It will be noted that this form of the invention is simple in its construction and the lens frames can be quickly adjusted with respect to the nose bridge and are provided with means whereby they may be adjusted either separately or simultaneously.

In Fig. V, I have illustrated a slightly modified form of the invention wherein the screw rod which supports the adjusting means is fixed against movement longitudinally and is provided with a cylindrical bore 22. The rod 23 which extends through the bore 22 is mounted for rotating and sliding movement and provided upon its inner end with a pocket 24, the outer end of which is rectangular in cross section and adapted to fit over the rectangular portion of the rod 23' so that upon turning movement of the rod 23 the rod 23' will be rotated therewith, and for a free turning movement of either of these rods the rod 23 is moved longitudinally to disengage the pocket from the rectangular section. It will be understood that as indicated in Fig. V the rod 23' is provided similarly with a threaded portion 5 secured to rotate therewith. Secured to the outer end of the rod 23 is a cap 25 which is provided with a sleeve 26 that fits over the end 27 of the rod 5 for sliding movement thereon. The cap is held in various positions by means of the spring actuated catch 29 carried by the sleeve 26 and adapted to engage within the recesses 28 formed in the reduced portion of the sleeve, whereby the rod 23 can be quickly and easily adjusted to engage and disengage the inner ends of the rods 5 and 23 with respect to each other. From this it will be apparent that the lens frames can be readily and quickly adjusted with respect to the face of the wearer and so arranged that they may be adjusted either separately or simultaneously.

In Fig. VI, I have illustrated a slightly modified form of the invention wherein the rods 5 and 5' are detachably connected together at their inner ends so that either one or both rods can be turned as desired. In this form of the invention a sleeve 30 is mounted upon the inner ends of the rods and held against turning movement by means of the pin 32 which is carried by one of the rods and engaged within a slot 31 formed within the sleeve 30. This sleeve is mounted for sliding movement and the movement is limited to the length of the slot 31 and in order to connect the two rods at their inner ends a transverse pin 33 is carried by the sleeve 30 and is adapted to engage in an aperture 34 formed within the inner end of the rod 5' whereby upon sliding movement of the sleeve 30 the pin 33 can be engaged with the aperture 34 to rotate both rods simultaneously or disengaged from this aperture to permit either rod to be rotated separately as desired.

In order that this sleeve may be readily actuated to engage the pin 33 with the aperture 34 I provide a pivoted catch 36 which is mounted upon the longitudinal bar 2 and having its inner end engaged within a slot 35 formed in the sleeve 30 and adapted to be manually operated to move the sleeve longitudinally upon the rods. From this it will be noted that by grasping the outer end of the catch and imparting a lateral movement thereto the sleeve 30 will be readily moved longitudinally to engage or disengage the inner ends of the rods.

I claim:

1. A trial frame including a longitudinal bar, adjustable rods carried by the bar, lens frames suspended from the rods, clutch faces formed on the inner ends of said rods and means whereby to engage and disengage the clutch faces to rotate said rods separately or simultaneously.

2. A trial frame including a longitudinal bar, adjustable rods carried by said bar, lens frames suspended from said rods, a collar secured to the bar at the outer end of one of said rods, having spaced grooves therein, clutch faces on the inner ends of said rods and a spring actuated catch carried by the outer end of one of said rods for engagement with the grooves in the collar whereby the lens frames may be adjusted on the rods separately or simultaneously.

3. A trial frame including a supporting portion, a pair of adjustable lens holders carried thereby, independent means for adjusting said lens holders, and means to connect the adjusting means for joint actuation.

4. A trial frame including a support and lens receiving frames carried thereby, independent adjusting rods for the frames, and means connecting the rods for simultaneous operation.

5. A trial frame including a support and lens receiving frames carried thereby, independent adjusting rods for the frames, means connecting the rods for simultaneous operation, and means for selectively securing the connection in operative or inoperative position.

6. A trial frame including a support, laterally shiftable lens cells carried thereby, independent adjusting bars for the lens cells, and a separable connection to lock the bars for joint operation.

In testimony whereof I have affixed my signature, in presence of two witnesses.

GEORGE H. DAY.

Witnesses:
WM. P. CHASE,
WILLIAM B. JONES.